United States Patent [19]

Fan et al.

[11] Patent Number: 4,503,127
[45] Date of Patent: Mar. 5, 1985

[54] HOT OIL PRETREATMENT OF FRIED VEGETABLE PRODUCTS

[75] Inventors: Lucy L. Fan; Javier A. Arce, both of Irving, Tex.

[73] Assignee: Frito-Lay, Inc., Dallas, Tex.

[21] Appl. No.: 558,350

[22] Filed: Dec. 5, 1983

[51] Int. Cl.$^3$ .................... A23L 1/212; A23L 1/216
[52] U.S. Cl. .................... 426/438; 426/637; 426/808
[58] Field of Search ............ 426/549, 550, 560, 637, 426/438, 441, 808, 622, 629, 634, 439, 440

[56] References Cited

U.S. PATENT DOCUMENTS

| | | | |
|---|---|---|---|
| 3,355,299 | 11/1967 | McLaughlin et al. | 426/441 |
| 3,597,239 | 8/1971 | Vahlsing | 426/438 X |
| 3,846,572 | 11/1974 | Nonaka et al. | 426/441 X |
| 3,922,370 | 11/1975 | Drakash | 426/808 X |
| 3,934,046 | 1/1976 | Weaver et al. | 426/441 X |
| 4,084,016 | 4/1978 | Kon et al. | 426/808 X |
| 4,140,803 | 2/1979 | Panchuk et al. | 426/438 X |
| 4,317,842 | 3/1982 | El-Hag et al. | 426/438 X |

FOREIGN PATENT DOCUMENTS 2313176  9/1973  Fed. Rep. of Germany ...... 426/637

*Primary Examiner*—Arthur L. Corbin
*Attorney, Agent, or Firm*—Bernard, Rothwell & Brown

[57] ABSTRACT

A method for the treatment of starchy vegetables, such as potatoes, before frying, wherein unwashed vegetables are heated in edible oil at a temperature below the gelatinization temperature of the vegetable starch before being transferred to the fryer. The method eliminates losses of solids during water washing and carry over of surface water to the fryer. The use of this invention facilitates the production of potato chips, french fries, and other fried vegetables with a higher percentage of recovered solids and a lower percentage of included lipids, while requiring lower energy consumption.

9 Claims, 2 Drawing Figures

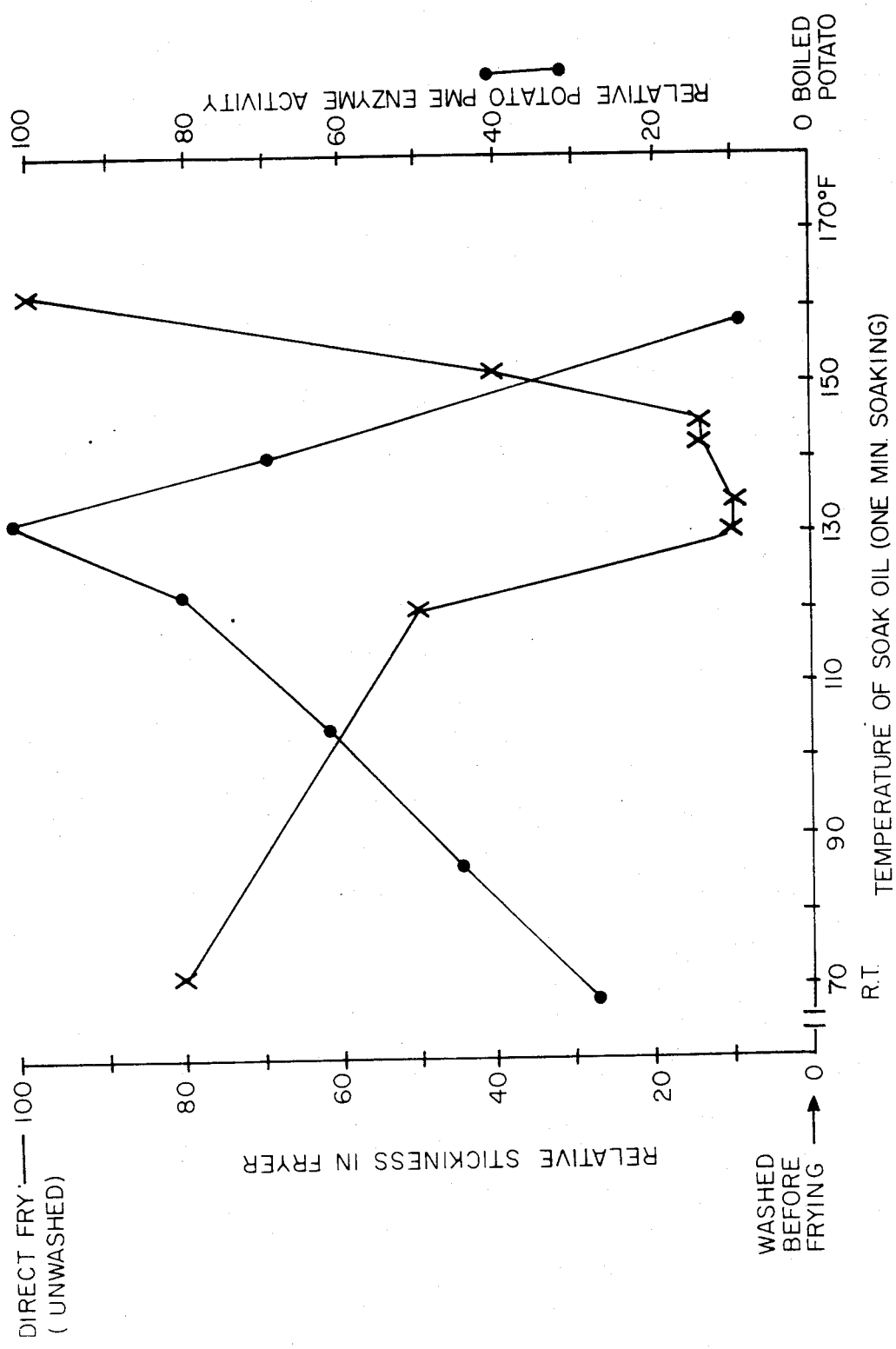

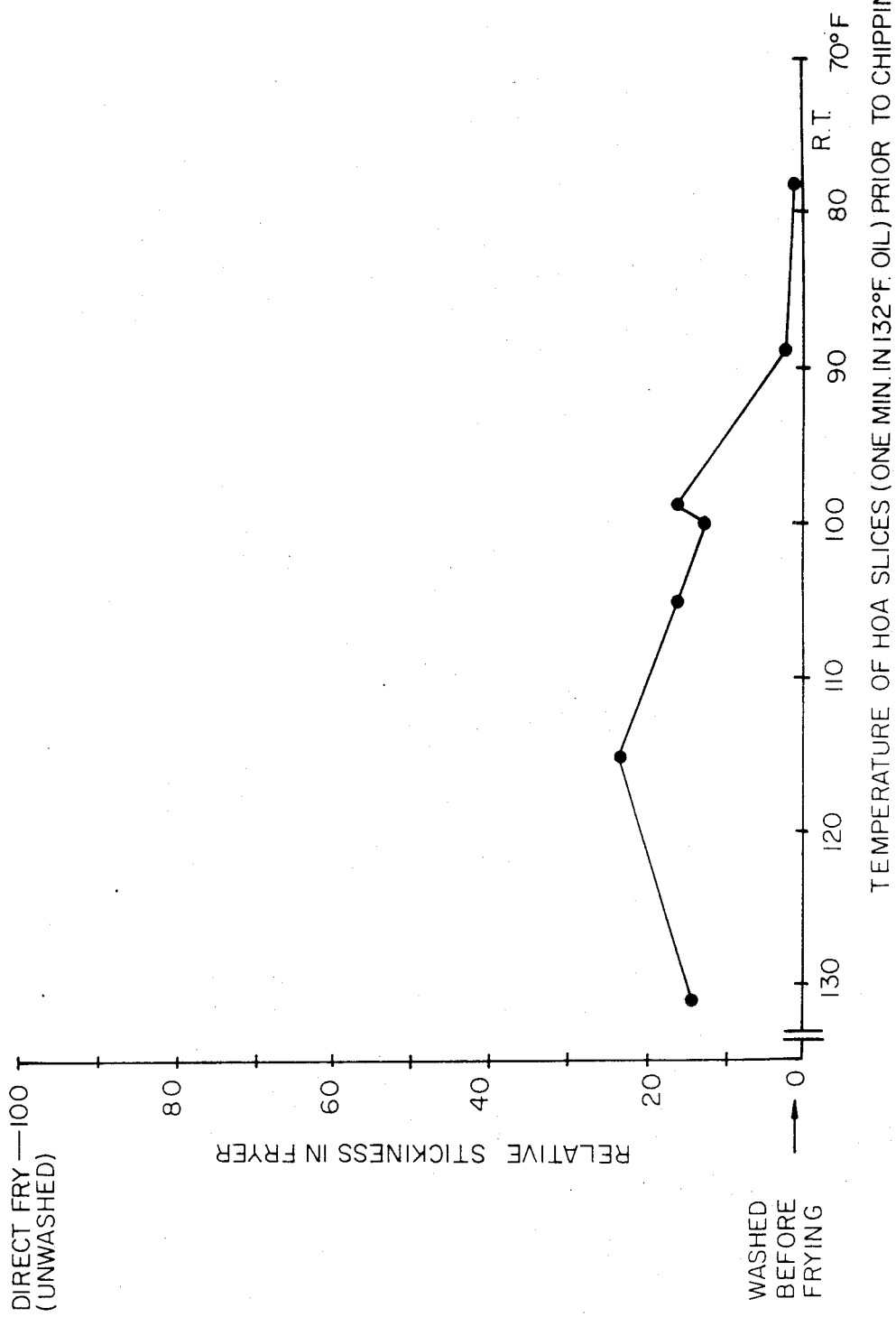

HOT OIL PRETREATMENT OF FRIED VEGETABLE PRODUCTS

BACKGROUND OF THE INVENTION

1. Field of the Invention

This invention relates to improvements in the art of frying vegetables, particularly potato chips, and especially to a hot oil pretreatment of potato slices prior to frying which lowers the percentage of fat in the fried product, improves solids recovery, conserves energy, and prevents sticking of the potato slices during cooking.

2. Prior Art

Potatoes are tubers cultivated primarily for the value of the starch granules present in the cells. Potatoes usually contain less than 20% solids, and common cooking procedures such as baking and frying use thermal or microwave energy to drive off a portion of the included water. Fried potato products are particularly favored as convenience snack foods and potato chips, for example, are available in most grocery stores and many restaurants. Potato chips are prepared in automated plants using a number of processing machines, many of which have been patented (by way of illustration, see U.S. Pat. Nos. 2,091,675 and 2,179,035) and by performing a number of common steps which have been the subject of frequent modification (see U.S. Pat. Nos. 4,283,437 and 2,611,705). Processes to make fried potato products directly from potatoes involve some combination of these basic steps: (1) peeling, (2) slicing, (3) washing, (4) frying in edible oils, (5) seasoning. Slices are usually washed after slicing and before frying to remove surface starch which otherwise causes the chips to stick to each other during frying. Starch build-up in the fryer is a related problem in high-volume operations.

The washing process is done in any of a variety of devices which use warm water and agitation to separate and wash the slices (see U.S. Pat. Nos. 3,223,024, 4,251,895 and 4,272,554 for exemplary processes). Coincidentally, the designs usually provide a means whereby slices too small to be included in the commercial product are selected out, and the starch and fragments are removed as the process water is changed. Many processes also use water to cool and lubricate the slicer and/or to convey slices from the slicer to the wash tank. The wash water may be filtered to remove the starch and recycled. The wash water must eventually be discharged and replaced and must usually be treated to meet discharge permit specifications (effluent pollution control requirements).

Wash water adheres to the surfaces of the washed potato slices. If the potato slices are fried immediately after washing, this surface water may constitute a significant amount (e.g., about 15%) of the total water removed by evaporation during frying. Added water in a hot oil fryer also contributes to loss of oil due to the "steam distillation" of the oil in a two-phase system.

An associated problem encountered in frying sliced potatoes and other starchy vegetables is clumping during frying. Even after much of the surface starch has been washed off, the soft surface of the slice is still somewhat sticky and slices tend to adhere to each other in the cooking oil, producing lumps or products which are unevenly cooked and which must be discarded. Numerous attempts have been made to circumvent this problem. Vigerstrom (U.S. Pat. No. 3,997,678) described a process for heating the potato by means of an electric current passed through the wash water. Cardis et al (U.S. Pat. No. 4,251,895) described a combination of air jet and suction to remove water, starch and adherent potato fragments between washing and frying steps, and also described a modified fryer to remove eddy currents in the cooking oil (U.S. Pat. No. 4,392,420).

Other attempts to produce a satisfactory product have avoided frying. Mancuso et al. (U.S. Pat. No. 3,402,059) soaked the potato slices in hot oil and then baked them in an oven. Vogt (U.S. Pat. No. 4,068,572) described a convection oven and rack for keeping potato products separate during cooking. Wicklund et al. (U.S. Pat. No. 4,277,510) described a process in which the potatoes are boiled in water before slicing, then washed and baked in an oven. Yuan et al. (U.S. Pat. No. 4,283,425) described a process for coating the washed slices with albumin and cooking in a microwave oven.

Another undesired effect of the traditional methods for frying foods is the high percentage of lipid which remains in the final product. Typical lipids (fats and oils) used in deep frying are triglycerides which are readily saponified and absorbed in the small intestine. Triglycerides provide twice the calories per gram of carbohydrates and proteins, and typical potato chips contain as much as 40% lipid by weight. Many of the alternative processes described for making foods which are similar in appearance to fried foods yield a product lower in lipid, but achieve the result by inclusion of more process steps, the addition of more ingredients, or by less efficient heat-transfer steps. For example, Murray (U.S. Pat. No. Re. 27,531) describes a process for recoating a blanched potato with amylose starch to provide a barrier to oil uptake. The result of these processes rarely has the uniquely satisfying taste, texture or appearance of a good potato chip, french fry, or similar food product.

SUMMARY OF THE INVENTION

This invention provides a novel method for treating whole sliced or chopped starch-containing vegetables which also contain the enzyme pectin methylesterase. The sliced or chopped vegetable is heated in oil to a temperature below the gelatinizing temperature of the starch, but sufficient to break down cell membranes and activate the enzyme, cooled to form a non-sticky surface, and fried in the traditional conventional manner. The resultant food product is uniform in texture and appearance, less oily and contains more food solids than similar products prepared by traditional methods. In addition, the process requires less energy than other methods heretofore disclosed and produces a smaller volume of waste material.

BRIEF DESCRIPTION OF THE DRAWING

FIG. 1 is a plot of relative slice stickiness and pectin methylesterase activity at various temperatures.

FIG. 2 is a plot of relative slice stickiness of preheated slices cooled to different temperatures before frying.

DETAILED DESCRIPTION OF THE PREFERRED EMBODIMENTS

Sliced starchy vegetables contain several layers of cells containing water and starch in their protoplasm. In the interstices of the intact cells are ruptured cells resulting from mechanical disruption during slicing, electrolytes, and starch granules released from the ruptured cells. The result is a slice with little structural rigidity and a sticky surface. To prevent the slices from sticking together during cooking it has been found necessary to wash the slices in a liquid which will remove most of the extracellular starch. Warm water is typically used for this purpose. The washing process, while producing a slice which cooks without excessive sticking, causes significant loss of potato solids and frequently causes further breakage of the slice. The washed slices also carry extra water into the fryer, which must then be evaporated through the expenditure of energy. It has been discovered that heating the potato to a temperature below the gelatinizing temperature of the starch, e.g., between 50°–60° C. (122°–140° F.), breaks down the cellular membranes allowing potassium ions to enter the cell wall and activate therein the enzyme pectin methylesterase (E.C. 3.1.1.11), which cleaves the methyl esters of pectin in the cell wall and produces free carboxyl groups which can then cross-link through the calcium and magnesium cations which are available in the extracellular space. Bartolome et al., *J. Agr. Food Chem.*, 20, 266 (1972). The cell wall in which the pectin methylesterase has been activated is more rigid than that which has not been heated and cross-linked. The free carboxyl groups not complexed with calcium or magnesium cations may be available to hydrogen bond with water, and out NMR studies indicate that a much higher ratio of immobilized to free water does exist in the hot-water treated potato. In addition, the heating was found to raise the gelatinization temperature of the starch by about 2° C. Since the variety of the potato and the time between harvesting and use cause a variation in the gelatinization temperature of the starch, raising the gelatinization temperature by pre-heating helps to ensure that there is no gelatinized starch on the surface of the slice after pre-heating. Finally, the breakdown of the cell membrane allows the release of other cellular components, such as phospholipids, which can migrate to the surface of the slice.

The potato slices may be heated in water, but the heating is more advantageously done in an edible oil. The oil, which in the preferred embodiment is the same as that used for frying, may also be used to cool and lubricate the slicer and to convey the slices in a sluice to the pretreatment tank. The oil may be recirculated and treated to remove water, starch and small fragments of potato. In our studies, we have found that the advantages of this invention are found only within a small temperature range. The cellular membrane remains intact below 50° C. (122° F.) and prevents activation of the pectin methylesterase. Above 68° C. (155° F.) the starch granules gelatinize and the slices become sticky again. In the preferred embodiment, the hot oil is kept in the range of 54°–60° C. (130°–140° F.) to allow the heat to penetrate to the middle of the slice when the slices are kept in the oil for about 30 seconds to 1 minute.

It has further been found that the invention is most effectively practiced when the treated potato slice is cooled to at least 40° C. (104° F.), preferably 32° C. (90° F.) before final cooking. At this temperature or below, the oil from the treating tank coats the surface of the potato slice and allows the relatively hard surfaces of the slices to slide easily across each other. During cooling, excess oil is drained from the slice. The cooled slices may then be cooked in any manner known to those familiar with the art, although in the preferred embodiment the slices are fried in edible oil.

The potato slices which have been pretreated in hot oil are at least semi-rigid and can be removed from the wash oil by basket or conveyor with little damage to the slices. No special precaution is required to prevent the slices from stacking or otherwise contacting each other. Conventional conveyor systems, routinely used in the industry to transfer water washed slices to the fryer, can be used to implement this invention. Because the vegetable oil has lubricating qualities superior to water, less liquid is needed to lubricate and cool the slicer and pumping costs are, therefore, less.

An unexpected advantage obtained by the practice of this invention is a decrease in the percentage of oil included in the fried product. For reasons which presently are not completely understood, but which are related to the amount of solids in the potato, which may be related to the presence of starch on the surface of the slice, and which may be related to the hydrogen bonding of water to carboxyl groups described previously, approximately 5 to 10% less oil (by weight) is included in the fried product, i.e., total oil is reduced from, for example, 40% to between 36 to 38%. Frying of potatoes may be conceptualized as the replacement of water in the cells with triglycerides, and it was noted during our studies of the enzyme activation procedure that potato slices activated in hot water also contained less oil in the fried chip, although the yield from the process was consistently less. For whatever reasons, the pre-heating of the potato to activate pectin methylesterase results in a product with a lower fat content, and which is more acceptable to persons concerned with fat and caloric uptake.

Another particularly beneficial result obtained from the practice of this invention is the increased retention of potato solids in the fried products. Conventional cooking techniques which involve water washing of the slices provide a total solids recovery (weight of solids in chips divided by weight of solids in the uncooked slices) of approximately 85%. Heating in water to activate the enzyme does not appreciably improve the solids recovery. When the slices are pre-heated in oil, solids recovery is typically about 95%. Since the lost solids are waste, there is a corresponding decrease in the amount of waste which must be handled. The implementation of this invention, therefore, may result in a significant economic benefit from mass balance considerations alone.

An additional advantage of this invention is the improved efficiency of the final frying process. Water carried on the surface of the water-washed slices is driven off with the cellular water in the fryer. By eliminating the surface water, the preferred practice of this invention lowers the demand for energy input into the fryer in three ways. Firstly, there is less water entering the fryer and, therefore, less energy needed to boil it off. Secondly, because the steam produced from heating the water carries off hot oil in the process of steam distillation, elimination of surface water lessens the amount of hot oil distilled out of the fryer and, therefore, requires that less oil be heated to keep the volume of oil in the fryer constant. Thirdly, hourly throughput is increased because heat input into the frying oil is the principal limitation on the rate at which slices can be introduced into the fryer. A 10% decrease in frying time has been observed when comparing oil washed slices with water washed slices, which suggests a 10% increase in throughput. Higher throughput thus lowers the energy loss per kilogram of product in the heat transfer steps (e.g., radiation from the external surface of the fryer and hot oil pipes and in heat exchanger efficiencies).

The invention has been described for use with potatoes and traditional commercial production of such snack foods as potato chips and french fried or shoestring potatoes. The invention is equally applicable to other snack foods which contain the enzyme pectin methylesterase and free starch and which are prepared by frying in fat or baking. Examples, which are not intended to be limiting, are beans and dough-based snack foods containing corn meal and flour, potato flakes, and bean flour. When the preparation of the flour involves inactivation of the enzyme by heating, the enzyme derived from other sources, such as fruit, may be introduced in the formulation of the dough. The following examples illustrate the applicability and advantages of the present invention, without intending to be limiting thereof. It will be appreciated that modifications of the present invention, within the skill of those familiar with the cooking arts, can be undertaken without departure from the spirit or scope of this invention.

EXAMPLE 1

Monona potatoes with an average solids content of 15.5%, and Norchip potatoes with an average solids content of 18.7% were washed and peeled in an abrasive peeler and sliced with an Urschel slicer. The slices were separated into three groups and weighed. Group A was washed for 10 seconds in water (25° C.) and fried in vegetable oil at 184° C. (365° F.). Group B was not washed, but fried directly in vegetable oil at 184° C. (365° F.). Group C was placed in vegetable oil at 55° C. for 1 minute, cooled to 32° C. and fried in 184° C. vegetable oil. Similar Monona and Norchip potatoes (Group D) were treated as follows: washed and peeled, heated to 60° C. in water for two hours, sliced with an Urschel hand slicer and fried in 184° C. oil. Each group was drained and analyzed for percent oil, yield and solids recovery. The percentage of oil in each group of chips was determined by extraction with anhydrous ether for 6 hours in a Soxhlet extractor, removal of the ether by vacuum evaporation from a thin film (Buchler ® Rotary Evaporator) and weighing (A.O.A.C. 13th ed., Section No. 7.055). The present yield was determined by weighing the dried chips at the end of the frying step and dividing by the weight of the slices before activation and cooking. The percentage of recovered solids was determined by weighing the finished chips after extraction of oils and removal of moisture, as described above, drying in a vacuum oven, and dividing by the weight of the uncooked slice after drying in a vacuum oven. The results of these determinations are summarized in Table 1.

TABLE 1

Comparison of Solids Loss by Direct Determination

| Measurements | A | B | C | D |
|---|---|---|---|---|
| Experiment I[a]: | | | | |
| % Oil in Chips | 46.2 | 41.9 | 40.6 | 46.7 |
| % Yield[c] | 29.1 | 27.7 | 31.8 | 28.2 |
| % Solids Recovery[d] | 86.3 | 90.8 | 95.8 | 85.5 |
| Experiment II[b]: | | | | |
| % Oil in Chips | 37.7 | 35.3 | 34.2 | 31.3 |
| % Yield[c] | 34.0 | 38.4 | 38.9 | 32.1 |
| % Solids Recovery[d] | 84.6 | 92.8 | 95.0 | 83.3 |

[a] = Experiment was performed, using Monona potatoes of % Solids = 15.5.
[b] = Experiment was performed, using Norchip potatoes of % Solids = 18.7.
[c] = % Yield = 100 × $\frac{\text{weight of chips}}{\text{weight of potato slices before chipping}}$
[d] = % Solids Recovery = 100 × $\frac{\text{weight of potato solids in chips (direct solids measurement)}}{\text{weight of potato solids in chipping slices (direct solids measurement)}}$

EXAMPLE 2

The relative stickiness of potato slices heated to different temperatures was determined by a semiquantitative test. Slices were heated for one minute at the temperatures indicated in FIG. 1, dried on a rack and cooled to room temperature. Four slices from each temperature group were stacked on each other and placed in a fryer containing cooking oil at 184° C. After four seconds, the number of slices not adhering to another slice was counted. If all four were separate, the value of 100% was assigned; if two were separated, the value of 50% was assigned; if one was free, a value of 25% was assigned; if all remained adherent, a value of 0% was assigned. The results of eight determinations of stickiness at each temperature are presented in FIG. 1 superimposed on the results of the potato pectin methylesterase enzyme activity determination as reported in the literature (Puri, et al., *Food Chem.*, 8, 203–213 (1982)). For additional background, see Bartolome, et al., *J. Agr. Food Chem.*, 20, 262 (1972). Decreased stickiness is directly associated with increased enzymatic activity, and the temperature of the maximum enzymatic activity corresponds to the minimum stickiness. Above the gelatinization temperature, stickiness is primarily a result of gelatinization of starches.

EXAMPLE 3

The stickiness of hot oil treated potato slices was measured after the slices had been cooled to various temperatures before frying (chipping). Slices were heated for 1 minute in vegetable oil at 55° C. and placed on a metal screen to drain. The surface temperature was measured with a thermometer. When the slices had cooled to the desired temperature four slices were stacked and stickiness was determined by the method described in Example 2. The results were standardized by comparing with those obtained from traditional treatment (0%) and those which were fried directly after slicing (100%), and are shown in FIG. 2.

EXAMPLE 4

Monona potatoes were peeled and sliced with an Urschel hand slicer, and divided into three groups. Group A was heated for one minute in water at 55° C.; Group B was heated in vegetable oil for one minute at 55° C.; and Group C was soaked for one minute at room temperature in vegetable oil. The slices were drained, allowed to cool to room temperature, and tested for stickiness by the method of Example 2. The data from eight experiments are shown in Table 2.

TABLE 2

| | Relative Stickiness of Treated Potato Slices | | |
|---|---|---|---|
| | Group A | Group B | Group C |
| % Sticking | 25% | 0% | 75% |

From the Table, it was determined that the enzyme activation contributes approximately 75 percent of the non-sticking behavior, and the surface coating of the oil contributes approximately 25 percent.

What is claimed is:

1. A method for preparing fried vegetable products which eliminates stickiness and clumping of individual whole, sliced or chopped vegetables during frying, the method comprising:
   (a) heating whole, sliced or chopped vegetables containing the enzyme pectin methylesterase in edible vegetable oil to a temperature high enough to activate the enzyme but less than the gelatinization temperature of the vegetable starch, and then
   (b) frying the vegetables in an edible vegetable oil.

2. The method of claim 1 in which the heated vegetables are cooled to at least about 40° C. before being fried.

3. The method of claim 1 in which the vegetables are potatoes and the fried vegetable products are potato chips.

4. The method of claim 1 in which the vegetables are potatoes and the fried vegetable products are fried potato strips.

5. The method of claim 1 in which the vegetables are dough comprised of flour or flake derived from a starch-containing grain, and the products are fried chips.

6. The method of claim 5, in which the flour or flake is derived from potato.

7. The method of claim 5, in which the flour or flake is derived from corn.

8. The method of claim 5, in which the flour or flake is derived from bean.

9. The method of claim 1 in which the vegetables are potatoes and the temperature of heating is at least about 50° C. but less than about 60° C.

* * * * *

UNITED STATES PATENT AND TRADEMARK OFFICE
CERTIFICATE OF CORRECTION

PATENT NO. : 4,503,127
DATED : March 5, 1985
INVENTOR(S) : Lucy L. Fan and Javier A. Arce It is certified that error appears in the above-identified patent and that said Letters Patent is hereby corrected as shown below:

Column 3, line 26, before "NMR" delete "out" and substitute therefor --our--.

Signed and Sealed this

Ninth Day of July 1985

[SEAL]

Attest:

DONALD J. QUIGG

Attesting Officer

Acting Commissioner of Patents and Trademarks